United States Patent
Lappe et al.

(10) Patent No.: US 6,920,124 B1
(45) Date of Patent: Jul. 19, 2005

(54) METHOD FOR TRANSMITTING DIGITAL USEFUL DATA

(75) Inventors: Dirk Lappe, Schellerten/Dinklar (DE); Martin Hans, Hildesheim (DE); Josef Laumen, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,084

(22) PCT Filed: Jul. 23, 1999

(86) PCT No.: PCT/DE99/02245

§ 371 (c)(1),
(2), (4) Date: Apr. 5, 2001

(87) PCT Pub. No.: WO00/07397

PCT Pub. Date: Feb. 10, 2000

(30) Foreign Application Priority Data

Jul. 24, 1998 (DE) ........................ 198 33 318

(51) Int. Cl.⁷ ................................. H04J 3/16
(52) U.S. Cl. ...................... 370/337; 370/328; 370/329; 370/342; 370/349
(58) Field of Search ................................ 370/315, 316, 370/322, 326, 328, 329, 336, 342, 349, 337, 208, 252, 433, 503, 524; 714/708, 752, 799; 455/435.1, 426.1; 340/825.49

(56) References Cited

U.S. PATENT DOCUMENTS

| | | | |
|---|---|---|---|
| 5,377,194 A | * 12/1994 | Calderbank | 370/524 |
| 5,533,012 A | * 7/1996 | Fukasawa et al. | 370/342 |
| 5,687,165 A | * 11/1997 | Daffara et al. | 370/208 |
| 5,689,245 A | * 11/1997 | Noreen et al. | 340/825.49 |
| 5,701,294 A | * 12/1997 | Ward et al. | 370/252 |
| 5,729,531 A | * 3/1998 | Raith et al. | 370/252 |
| 5,734,979 A | 3/1998 | White | |
| 5,757,813 A | * 5/1998 | Raith | 714/708 |
| 5,768,308 A | 6/1998 | Pon et al. | |
| 6,016,428 A | * 1/2000 | Diachina et al. | 455/435.1 |
| 6,021,518 A | * 2/2000 | Pelz | 714/799 |
| 6,112,084 A | * 8/2000 | Sicher et al. | 370/337 |
| 6,134,220 A | * 10/2000 | Le Strat et al. | 370/252 |
| 6,256,497 B1 | * 7/2001 | Chambers | 455/433 |
| 6,339,601 B1 | * 1/2002 | Seong et al. | 370/503 |

FOREIGN PATENT DOCUMENTS

| | | |
|---|---|---|
| EP | 0 849 965 A | 6/1998 |
| EP | 0 849 965 A1 | 6/1998 |
| GB | 2 241 850 A | 9/1991 |
| WO | 96 19907 A | 6/1996 |
| WO | 97 12488 A | 4/1997 |

* cited by examiner

*Primary Examiner*—Phirin Sam
*Assistant Examiner*—Anthony Ton
(74) *Attorney, Agent, or Firm*—Michael J. Striker

(57) ABSTRACT

The method for transmitting useful digital data from a first (1) to a second mobile station (5) saves computing costs and prevent data loss. In this method for transmission in a first network (10), the first station (1) source encodes useful data in a first step and then channel encodes the source encoded useful data in a second step. The encoded useful data are transmitted as a first bit stream to an intermediary station (15) via a transmission channel of the first network (10). The encoded useful data in the first bit stream are channel decoded by the intermediary station (15). For transmission in a second network (20), the useful data are again channel encoded by the intermediary station (15) and are transmitted to a second mobile station (5) via a transmission channel of the second network (20). Signalization data containing information regarding the encoding in the first step are transmitted from the intermediary station (15) to the second mobile station (5). The useful data coded in the second step are channel decoded by the second mobile station (5). The resulting channel decoded useful data are then source decoded by the second mobile station (5) according to signalization data received by the second mobile station (5).

15 Claims, 1 Drawing Sheet

METHOD FOR TRANSMITTING DIGITAL USEFUL DATA

BACKGROUND OF THE INVENTION

1. Field of the Invention

Figure 1:
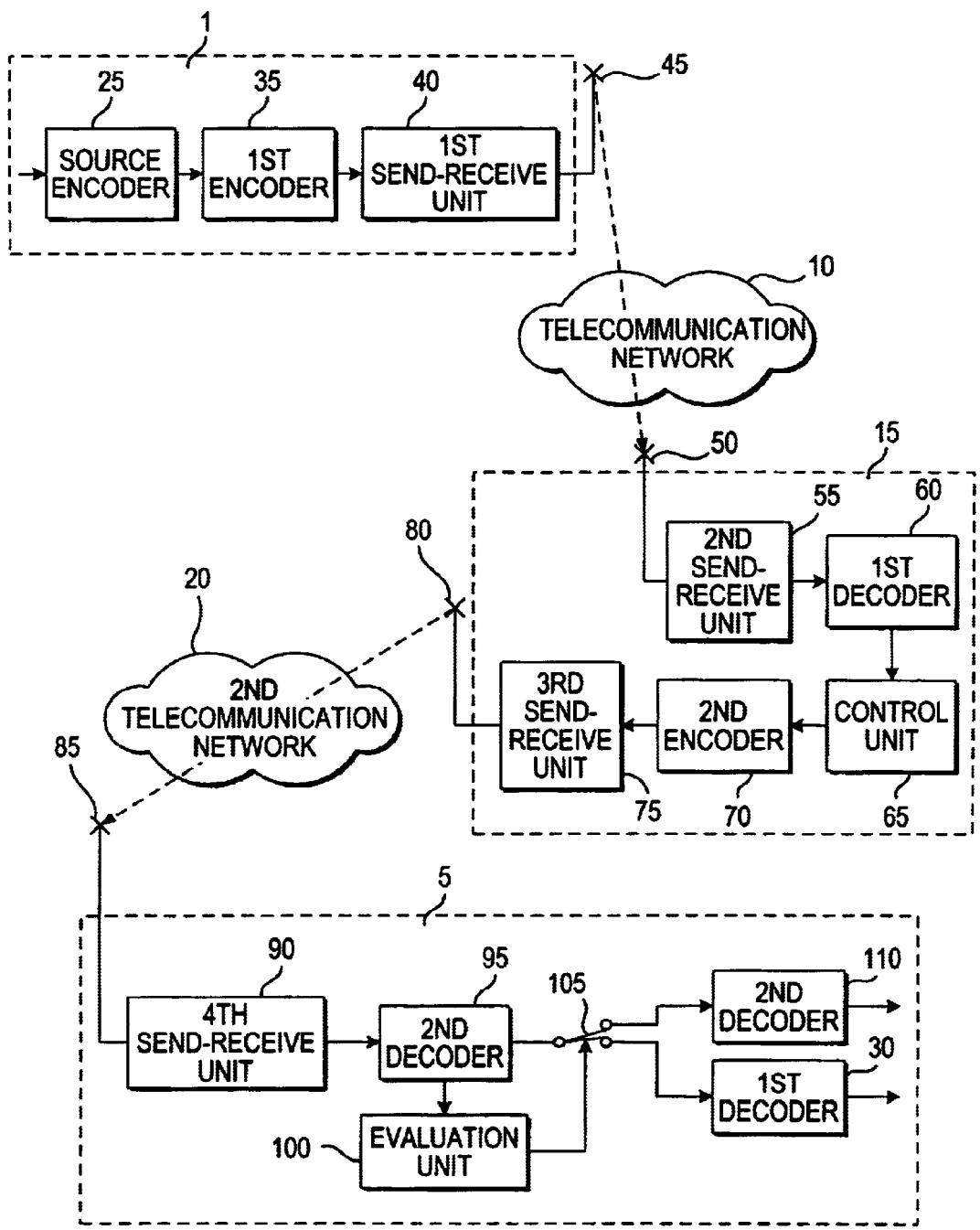

The invention relates to a method for transmitting useful digital data from a first mobile station to a second mobile station.

2. Prior Art

Method for transmitting useful digital data from a first mobile station to a second mobile station are already known and are embodied for voice transmission, for example, in accordance with the GSM standard (Global System for Mobile Communications).

EP 0 849 965 A1 has disclosed a telephone device, which can telephone in a particularly advantageous manner in enclosed spaces via both an existing mobile radio network and a fixed telecommunication network with the aid of a dual-mode base station. The dual-mode base station, which can also be referred to as a twin station, has a DECT charging station and a DCS/GSM charging station with a voice interface. By plugging the DCS/GSM mobile station into the dual-mode base station, the mobile station is given the ability to receive mobile radio signals. These mobile radio signals are then converted into DECT signals. The connection to the DECT mobile phone is then established via a DECT antenna. In a similar manner, the PSDN/ISDN signals are also converted and emitted via DECT.

SUMMARY OF THE INVENTION

It is an object of the present invention to provide an improved method of transmitting useful digital data between mobile stations.

The method according to the invention has advantages has the following advantageous features: that for the transmission in a first telecommunication network, the first mobile station encodes, preferably source encodes, the useful data in a first step and encodes, preferably channel encodes, the useful data in a second step, that the useful data encoded in the first and second steps are transmitted in the form of a first bit stream to an intermediary station via a transmission channel of the first telecommunication network, in particular via at least one third telecommunication network, that the useful data of the first bit stream are decoded, preferably channel decoded, by the intermediary station in the second step, that for the transmission in a second telecommunication network, the useful data are encoded, preferably channel encoded, by the intermediary station in the second step, that the useful data are transmitted to the second mobile station via a transmission channel of the second telecommunication network, that signalization data are transmitted from the intermediary station to the second mobile station, wherein the signalization data contain information regarding the type of encoding of the useful data in the first step, that the useful data are decoded, preferably channel decoded, by the second mobile station in the second step, and that the useful data decoded by the second mobile station in the second step are decoded, preferably source decoded, by the second mobile station in the first step, depending on the signalization data received by the second mobile station. In this manner, the useful data received in the intermediary station are only decoded in the second step, but not in the first step. Then an encoding in the first step for the transmission of the useful data in the second telecommunication network is not necessary. A decoding in the first step of the useful data received in the second mobile station can then take place through the evaluation of the signalization data transmitted along with the useful data by the intermediary station. A transcoding between different codes for the encoding in the first step for transmission in the respective telecommunication network can consequently be avoided, which can save computing costs and prevent the lost of useful data that occurs during a transcoding.

Advantageous improvements and updates of the method disclosed in the main claim are possible through the measures taken in the dependent claims.

It is particularly advantageous that the useful data in the first telecommunication network are transmitted in accordance with a first mobile radio standard, in particular in accordance with the GSM standard (Global System for Mobile Communications), encoded, preferably source encoded and channel encoded, in the first and second step, that the useful data in the second telecommunication network are encoded, preferably channel encoded, in the second step and are transmitted in accordance with a second mobile radio standard, in particular in accordance with the UMTS standard (Universal Mobile Telecommunications System), together with the signalization data, which include information regarding the encoding of the useful data in the first step in accordance with the first mobile radio standard, and that the useful data, which are decoded, preferably channel decoded, by the second mobile station in the second step, are decoded, preferably source decoded, by the second mobile station in accordance with the first mobile radio standard after the evaluation of the signalization data. In this manner, useful data can be transmitted between mobile stations with a respective air interface embodied according to a different mobile radio standard without which a transcoding of the useful data with regard to the code for the encoding in the first step would be required, provided that the second mobile station which receives the useful data is in a position to execute a decoding of the received useful data in the first step in accordance with the first mobile radio standard.

DRAWING

An exemplary embodiment of the invention is shown in the drawing and will be described in detail in the subsequent description.

The sole FIGURE is a block circuit diagram for the transmission of useful data from a first mobile station. to a second mobile station via an intermediary station by means of different telecommunication networks.

DESCRIPTION OF THE EXEMPLARY EMBODIMENT

In the FIGURE, the reference numeral 1 indicates a first mobile station, which is embodied in accordance with a first mobile radio standard. The first mobile radio standard can, for example, be the GSM standard (Global System for Mobile Communications). The first mobile station 1 will be referred to below as a GSM mobile station. The FIGURE shows only those functional blocks of the first mobile station 1 that are required for the description of the method according to the invention. The first mobile station 1 includes an encoder 25 embodied as a source encoder for an encoding in a first step which encoder is embodied in accordance with the first mobile radio standard, the GSM standard in the example described. By means of a first encoder 35 embodied as a channel encoder for an encoding in a second step, which encoder is likewise embodied in accordance with the first mobile radio standard, the source encoder 25 is connected to a first send-receive unit 40, which is connected to a first send-receive antenna 45. Radio signals can be transmitted by the first send-receive antenna 45 to a second send-receive antenna 50 of an intermediary station 15 in accordance with the first mobile radio standard by means of a first telecommunication network 10 which is embodied as a GSM network in the exemplary embodiment described. The intermediary station 15 contains a second send-receive unit 55, which is connected to the second send-receive antenna 50. The second send-receive unit 55 is connected to a first decoder 60 embodied as a channel decoder for a decoding in the second step, which is connected to a control unit 65 of the intermediary station 15. By means of a second encoder 70 embodied as a channel encoder for the encoding in the second step, the control unit 65 is connected to a third send-receive unit 75 of the intermediary station 15, which is connected to a third send-receive antenna 80. The third send-receive antenna 80 transmits radio signals to a second mobile station 5 in accordance with a second mobile radio standard by means of a second telecommunication network 20. The second mobile radio standard can, for example, be the UMTS standard (Universal Mobile Telecommunications System). For the intermediary station 15 as well, the FIGURE shows only the functional blocks required for the description of the method according to the invention. The same is true for the second mobile station 5, which receives the radio signals from the intermediary station 15 by means of a fourth send-receive antenna 85. The second mobile station 5 includes a fourth send-receive unit 90 which is connected to the fourth send-receive antenna 85. The fourth send-receive unit 90 is also connected to a second decoder 95 embodied as a channel decoder for the decoding in the second step, which is connected to an evaluation unit 100. By means of a switch 105 that can be controlled by the evaluation unit 100, the second channel decoder 95 is connected either to a first decoder 30 embodied as a source decoder for a decoding in the first step or to a second decoder 110 embodied as a source decoder for the decoding in the first step. The first source decoder 30 is embodied in accordance with the first mobile radio standard and the second source decoder 110 is embodied in accordance with the second mobile radio standard. In the following, the UMTS standard has been selected by way of example for the second mobile radio standard so that the second mobile station 5 is at least partially embodied as a GSM/UMTS mobile station. The source encoder 25 is supplied with useful digital data, which can be video data, audio data, text data, voice data, and/or any other data. In the following, the transmission of useful data between the first mobile station 1 and the second mobile station 5 will be described by way of example in conjunction with the transmission of voice data. The source encoder 25 is then embodied as a voice encoder according to the first mobile radio standard, the GSM standard in this example. As a result, the voice encoder 25 can be based on the GSM standard ITU-T G. 729. The voice encoder 25 executes a source encoding of the useful data, which are supplied to it and are embodied as voice data, in accordance with the GSM standard. The voice data source encoded in this manner are supplied to the first channel encoder 35, which executes a channel encoding of the voice data, for example a folding encoding and a block encoding, in accordance with the GSM standard. The voice data source encoded and channel encoded in this manner are then transmitted via the first send-receive unit 40 from the first send-receive antenna 45 to the intermediary station 15 in the form of a first bit stream by means of a first transmission channel of the first telecommunication network 10 embodied as a GSM network. The bit stream received by the second send-receive antenna 50 is then supplied to the first channel decoder 60 via the second send-receive unit 55. The first send-receive antenna 45, together with the second send-receive antenna 50, thereby constitutes a so-called GSM air interface. The source encoded and channel encoded voice data of the first bit stream are then channel decoded in the first channel decoder 60 in accordance with the GSM standard. The voice data channel decoded in this manner are then source encoded again and are supplied to the control unit 65. Along with the voice data, the first mobile station 1 has also transmitted call identification data to the intermediary station 15, which identify the second mobile station 5 as the targeted subscriber for the voice data to be transmitted. These call identification data have been generated, for example, in a control unit, not shown in the drawing, of the first mobile station 1, are channel encoded by the first channel encoder 35, and are transmitted along with the voice data to the intermediary station 15 in the first bit stream. Together with the voice data, these call identification data are then also channel decoded by the first channel decoder 60 and likewise supplied to the control unit 65. The call information data can also be transmitted from the first mobile station 1 to the intermediary station 15 singly or multiply via a separate control channel, separate from the voice data and include the telephone number of the second mobile station 5 as the target station. The control unit 65 detects these call identification data and based on these data, designates the second mobile station 5 as the target subscriber for the voice data to be transmitted from the first mobile station 1. In this connection, it is known in the control unit 65 that in order to transmit the voice data from the intermediary station 15 to the second mobile station 5, a transmission channel must be established in the second telecommunication network 20. The transmission of voice data in the second telecommunication network 20 occurs in accordance with the second mobile radio standard, the UMTS standard in the exemplary embodiment described. The third send-receive antenna 80 and the fourth send-receive antenna 85 consequently constitute a UMTS air interface. It is also known in the control unit 65 that the intermediary station 15 can decode both useful signals source encoded in accordance with the GSM standard and useful signals source encoded in accordance with the UMTS standard. The control unit 65 therefore selects a data transmission service in accordance with the UMTS standard in which the voice data, which have been channel decoded but are still source encoded in accordance with the GSM standard, are embedded in a second bit stream in accordance with the UMTS standard.

The intermediary station 15 can also have the potential for a source decoding of received useful data in accordance with the GSM standard. In this instance, along with the call identification data, it is useful to also transmit, for example, the telephone number of the calling first mobile station 1 to the intermediary station 15 and to forgo a source decoding of the received useful data in the intermediary station 15 depending on the detection of this telephone number in the control unit 65.

The control unit 65 also embeds signalization data into the second bit steam, wherein the signalization data contains information regarding the type of source encoding of the useful data. The signalization data consequently indicate that the useful data in the form of voice data in the example described are source encoded according to the GSM standard. In the second channel encoder 70, the voice data and the signalization data of the second bit stream are channel encoded according to the UMTS standard for transmission in the second telecommunication network 20, for example likewise by means of a folding encoding and a block encoding. The third send-receive unit 75 transmits the thus channel encoded voice data and signalization data of the second bit stream to the second mobile station 5 via a transmission channel of the second telecommunication network which in this example, is embodied as a UMTS network. With the data transmission service selected by the control unit 65 in accordance with the UMTS standard, the transmission quality and the transmission data rate must be suitably selected in order to transmit the voice data which is still source encoded in accordance with the GSM standard. The second bit stream with the voice data and signalization data, which are channel encoded in accordance with the UMTS standard, is received by the fourth send-receive antenna 85 and is supplied to the second channel decoder 95 by means of the fourth send-receive unit 90. The second channel decoder 95 executes a channel decoding of the voice data and the signalization data of the second bit stream in accordance with the UMTS standard. The evaluation unit 100 detect the channel decoded signalization data which do in face contain known information regarding the type of source encoding of the received voice data of the second bit stream. In the current example, the evaluation unit 100 extracts from the channel decoded signalization data of the second bit stream the fact that the voice data of the second bit stream are source encoded in accordance with the GSM standard. The evaluation unit 100 therefore triggers the switch 105 in such a way that the second channel decoder 95 is connected to the first source decoder 30, which is embodied as a voice decoder in accordance with the GSM standard. For the case in which the evaluation unit 100 extracts from the received and channel decoded signalization data of the second bit stream the fact that the voice data of the second bit stream are source encoded in accordance with the UMTS standard, it triggers the switch 105 in such a way that it forms a connection—as depicted with dashed lines in the FIGURE—between the second channel decoder 95 and the second source decoder 110, which is then embodied as a voice decoder in accordance with the UMTS standard. According to the exemplary embodiment described, since the voice data of the second bit stream are source encoded in accordance with the GSM standard, the second channel decoder 95 is connected to the first voice decoder 30 and the voice data channel decoded in the second channel decoder 95 are source decoded in the first voice decoder 30. The channel decoded and source decoded voice signals present at the output of the first voice decoder 30 and the second voice decoder 110 are then supplied for further processing to additional function blocks not shown in the FIGURE.

The signalization data can also be transmitted from the intermediary station 15 to the second mobile station 5 singly or multiply via a separate control channel separate from the useful data and in turn can include the telephone number of the first mobile station 1 making the call, by means of which the evaluation unit 100 can likewise be induced to connect the first voice decoder 30 to the second channel decoder 95.

In lieu of or in addition to the voice data, at least video data and/or audio data and/or text data can also be transmitted as useful data from the first mobile station 1 to the second mobile station 5 in the manner described above and combined into one bit stream. The transmission in the first telecommunication network 10 and in the second telecommunication network 20 can take place, for example, in a frequency multiplexed or time multiplexed manner, wherein different multiplexing methods can be used for the two different telecommunication networks 10, 20. In this instance, for example, a conversion from time multiplexing to frequency multiplexing or vice versa would also have to be achieve in the intermediary station 15. Arbitrary other multiplexing or channel access methods can also be used.

With the method according to the invention, it is consequently possible, for example, to transmit useful data that are source encoded according to the GSM standard via a data connection according to the UMTS standard. In this manner, a request for the UMTS standard as the mobile radio standard of the third generation can be fulfilled to assure a backwards compatibility to the existing GSM standard as the mobile radio standard of the second generation in order to exchange useful data between GSM standard mobile stations and UMTS standard mobile stations via a mobile radio connection. The method according to the invention simplifies the transmission of useful data between mobile stations embodied in accordance with the GSM standard and those mobile stations that are embodied in accordance with both the GSM standard and the UMTS standard, wherein the UMTS air interface is used for the part of the data transmission from the corresponding telecommunication network to the mobile station that is embodied in accordance with both the GSM standard and the UMTS standard. As a result, the useful data in the mobile station that is embodied in accordance with both the GSM standard and the UMTS standard are of a quality that has not been reduced by a transcoding between a GSM standard source code and a UMTS standard source code.

The first telecommunication network 10 and the second telecommunication network 20 can each be embodied as a hybrid GSM/UMTS network which combines the functions of a GSM network and a UMTS network. The first telecommunication network 10 and the second telecommunication network 20 can also be identical.

The provision can also be made that the useful data from the first telecommunication network 10 can be transmitted via one or a number of arbitrary fixed networks and possibly via corresponding intermediary stations, to the second telecommunication network 20 and from there, on to the second mobile station 5, wherein a transcoding with regard to the source code of the useful data, i.e. a source decoding and new source encoding in the corresponding intermediary stations does not occur, but only a channel decoding and possibly, a new channel encoding.

For example, the standard IS95 provided in North America (Interim Standard 95), the PDC standard provided in Japan (Personal Digital Cellular), or the like can also be selected as the first mobile radio standard.

What is claimed is:

1. A method for transmitting useful data from a first mobile station (1) to a second mobile station (5), in which for transmission in a first telecommunication network (10), the first mobile station (1) source encodes useful data in a first step and then channel encodes the useful data in a second step; the useful data encoded in the first and second steps are transmitted in the form of a first bit stream to an intermediary station (15) via a transmission channel of the first telecommunication network (10); the useful data channel encoded in the second step presented in the first bit stream are channel decoded by the intermediary station (15); for transmission in a second telecommunication network (20), the useful data are channel encoded by the intermediary station (15) and the useful data thus channel encoded are transmitted to a second mobile station (5) via a transmission channel of the second telecommunication network (20), signalization data are transmitted from the intermediary station (15) to the second mobile station (5), said signalization data containing information regarding the type of encoding of the useful data in the first step, the useful data channel encoded in the intermediary station are channel decoded by the second mobile station (5), and then the useful data channel decoded by the second mobile station (5) are source decoded by the second mobile station (5), according to the signalization data received by the second mobile station (5).

2. The method according to claim 1, wherein the useful data encoded in the first and second steps are transmitted in the form of said first bit stream to said intermediary station (15) via at least one third telecommunication network.

3. The method according to claim 1, wherein the signalization data are added to the useful data channel decoded in the intermediary station (15) so that a second bit stream is produced for the transmission in said second telecommunication network (20), the useful data and the signalization data of the second bit stream are channel encoded by the intermediary station (15); the useful data and the signalization data of the second bit stream are transmitted to the second mobile station (5) via transmission channel of the second telecommunication network (20); the useful data and the signalization data of the second bit stream are channel decoded by the second mobile station (5) and then the useful data, which are channel decoded in the second step by the second mobile station (5), are source decoded by the second mobile station (5) according to the signalization data decoded by the second mobile station (5).

4. The method according to claim 1, wherein the useful data in the first telecommunication network (10) are transmitted in accordance with a first mobile radio standard; the useful data are source encoded and channel encoded in the first and second step respectively, the useful data in the second telecommunication network are channel encoded and are transmitted in accordance with a second mobile radio standard together with the signalization data, said signalization data include said information regarding the type of encoding of the useful data in the first step in accordance with the first mobile radio standard; and wherein the useful data coded in the second step, which are decoded by the second mobile station (5), are decoded by the second mobile station (5) in accordance with the first mobile radio standard after evaluating the signalization data.

5. The method according to claim 4, wherein said first mobile radio standard is a global system for mobile communications and said second mobile radio standard is universal mobile telecommunications system.

6. The method according to claim 4, wherein the useful data in the first mobile station (1) are source encoded by a voice encoder (25) according to GSM standard ITU-T G.729 and wherein the useful data in the second mobile station (5) are source decoded by a voice decoder (30) in accordance with the first mobile radio standard.

7. A method for transmitting useful data from a first mobile station (1) to a second mobile station (5), in which for transmission in a first telecommunication network (10), the first mobile station (1) encodes useful data in a first step and then encodes the useful data in a second step; the useful data encoded in the first and second steps are transmitted in the form of a first bit stream to an intermediary station (15) via a transmission channel of the first telecommunication network (10); the useful data encoded in the second step presented in the first bit stream are decoded by the intermediary station (15); for transmission in a second telecommunication network (20), the useful data are channel encoded by the intermediary station (15) and then are transmitted to a second mobile station (5) via a transmission channel of the second telecommunication network (20); signalization data are transmitted from the intermediary station (15) to the second mobile station (5), said signalization data containing information regarding the type of encoding of the useful data in the first step, the useful data encoded in the intermediary station are decoded by the second mobile station (5) and then the useful data coded in the first step are decoded by the second mobile station (5), according to the signalization data received by the second mobile station (5).

8. The method according to claim 7, wherein the useful data encoded in the first and second steps are transmitted in the form of said first bit stream to said intermediary station (15) via at least one third telecommunication network.

9. The method according to claim 7, wherein the signalization data are added to the useful data coded in the second step and decoded in the intermediary station (15) so that a second bit stream is produced for transmission in said second telecommunication network (20), the useful data and the signalization data of the second bit stream are encoded by the intermediary station (15), the useful data and the signalization data of the second bit stream are transmitted to the second mobile station (5) via a transmission channel of the second telecommunication network (20), the useful data coded in the second step and the signalization data of the second bit stream are decoded by the second mobile station (5), and the useful data coded in the first step, which are decoded in the second step by the second mobile station (5), are decoded by the second mobile station (5) according to the signalization data decoded by the second mobile station (5).

10. The method according to claim 7, wherein the useful data in the first telecommunication network (10) are transmitted in accordance with a first mobile standard; the useful data are source encoded and channel encoded in the first and second step, the useful data coded in the second telecommunication network are channel encoded and are transmitted in accordance with a second mobile radio standard together with the signalization data, said signalization data include said information regarding the type of encoding of the useful data in the first step in accordance with the first mobile radio standard; and wherein the useful data coded in the second step, which are decoded by the second mobile station (5), are decoded by the second mobile station (5) in accordance with the first mobile radio standard after evaluating the signalization data.

11. The method according to claim 10, wherein said first mobile radio standard is global system for mobile communications and said second mobile radio standard is universal mobile telecommunications system.

12. The method according to claim 10, wherein the useful data in the first mobile station (1) are source encoded by a voice encoder (25) according to GSM standard ITU-T G.729 and wherein the useful data in the second mobile station (5) are source decoded by a voice decoder (30) in accordance with the first mobile radio standard.

13. The method according to claim 1 or 7, wherein the signalization data are transmitted from said intermediary station (15) to said second mobile station (5) singly or multiply via a separate control channel.

14. The method according to claim 1, 3, 7 or 9, further comprising transmitting a telephone number of the first mobile station (1) along with said signalization data containing said information regarding said type of encoding of the useful data in the first step.

15. The method according to claim 1 or 7, wherein said useful data comprises at least one of video data, audio dat, text data and voice data.

* * * * *